Figure 1:
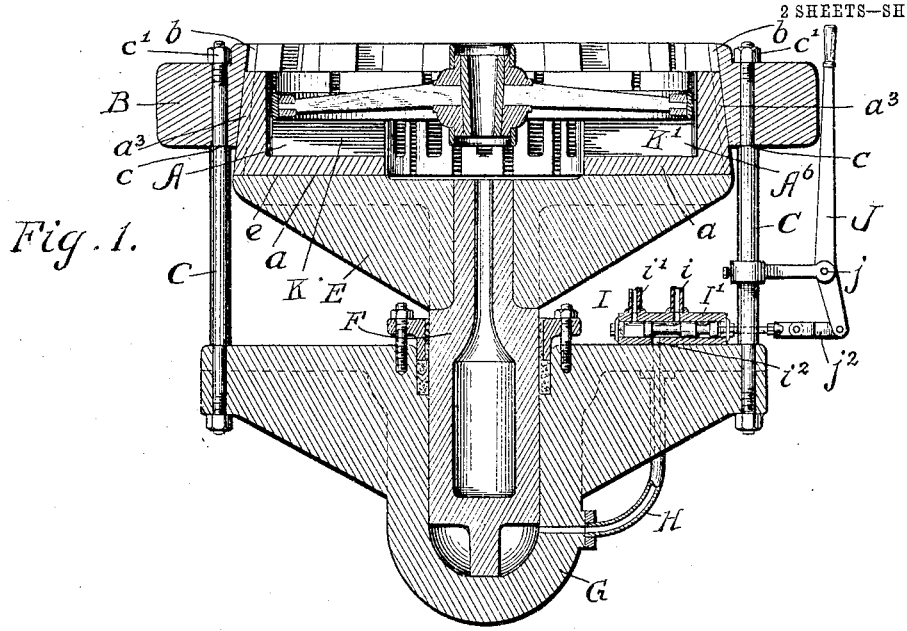

No. 789,013. PATENTED MAY 2, 1905.
E. EINFELDT.
MACHINE FOR UPSETTING TIRES.
APPLICATION FILED MAY 11, 1904.

2 SHEETS—SHEET 1.

Witnesses
Ernest Pulsford
A. M. E. Kennedy

Inventor
Emil Einfeldt
By P. T. Dodge
Attorney

No. 789,013. PATENTED MAY 2, 1905.
E. EINFELDT.
MACHINE FOR UPSETTING TIRES.
APPLICATION FILED MAY 11, 1904.

2 SHEETS—SHEET 2.

Witnesses
Ernest Pulsford.
A. M. E. Kennedy.

Inventor
Emil Einfeldt
B. P. T. Dodge
Attorney

No. 789,013.

Patented May 2, 1905.

UNITED STATES PATENT OFFICE.

EMIL EINFELDT, OF DAVENPORT, IOWA, ASSIGNOR TO BETTENDORF METAL WHEEL COMPANY, A CORPORATION OF IOWA.

MACHINE FOR UPSETTING TIRES.

SPECIFICATION forming part of Letters Patent No. 789,013, dated May 2, 1905.

Application filed May 11, 1904. Serial No. 207,394.

*To all whom it may concern:*

Be it known that I, EMIL EINFELDT, of Davenport, county of Scott, and State of Iowa, have invented a new and useful Improvement in Machines for Upsetting Tires, of which the following is a specification.

This invention relates to mechanism for shaping or truing bands, wheel-tires, and the like; and the invention consists in combining with a plurality of pressure members means whereby the movement of said members in the direction of the axis of the band or other object under operation will move said members also transversely of said axis and subject the band to pressure.

The machine is designed in the form illustrated in the drawings with special reference to the upsetting of wheel-tires in order to permanently set the same on the rim; but it will be understood that it is not confined in its use in this connection, but is applicable as well for the purpose of shaping or truing tires or bands or the like before they are applied to the wheels or other objects for which they are intended.

The invention also consists in the details of construction and combination of parts hereinafter described and claimed.

Figure 2:
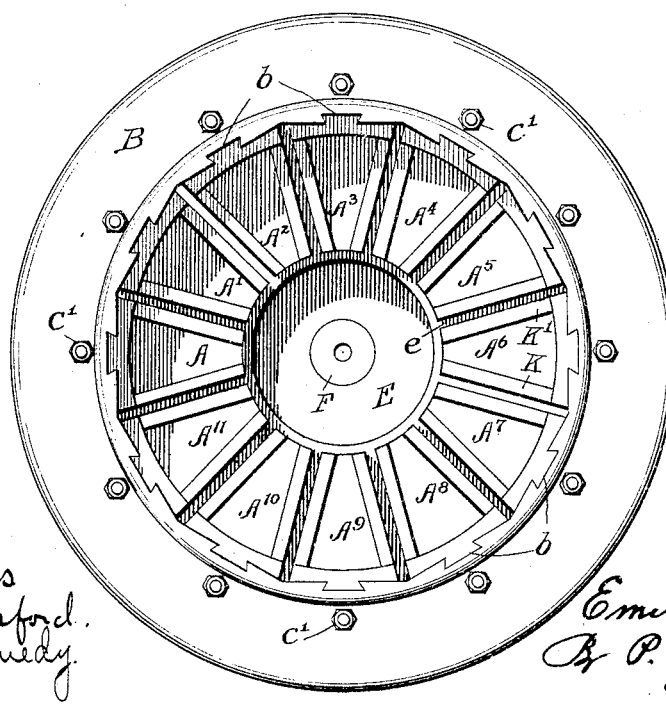
Figure 3:
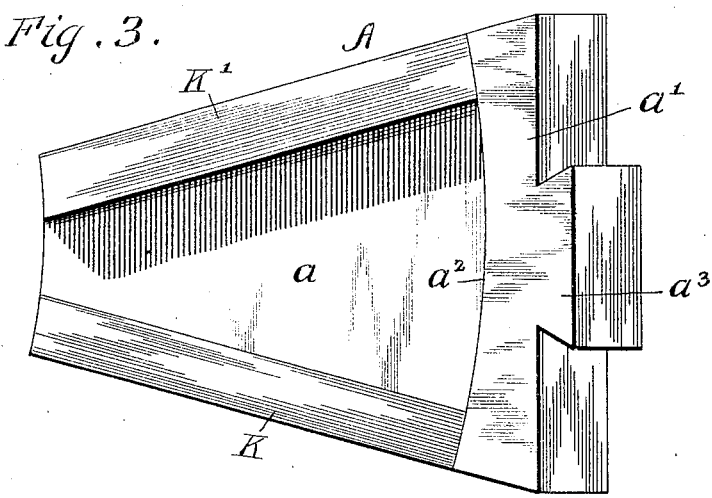
Figure 4:
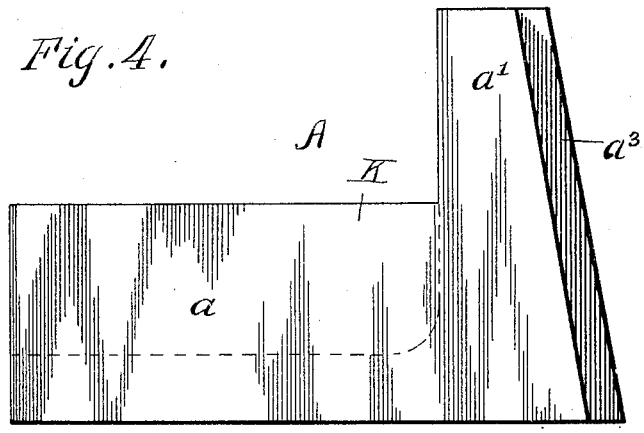
Figure 5:
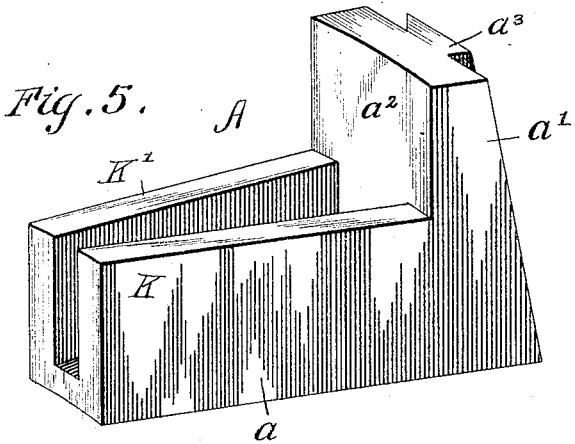

In the accompanying drawings, Figure 1 is a vertical longitudinal section through my improved mechanism, showing the wheel with the tire thereon in position to be acted on. Fig. 2 is a top plan view of the same. Fig. 3 is a top plan view of one of the pressure-blocks on an enlarged scale. Fig. 4 is a side elevation of the same. Fig. 5 is a perspective view of the same.

Referring to the drawings, A A', &c., represent a series of pressure members in the form of sector-blocks provided each with a horizontal inwardly-extending body portion or base $a$ and with an upright portion $a'$, the inner side of which is curved to form a pressure-face $a^2$, adapted to act on the tread of the tire and arranged around a common axis so that the faces $a^2$ will conjointly present a continuous circular pressure-surface adapted to embrace the tire throughout its circumference.

B represents a contracting-ring having its inner face beveled outwardly and downwardly and formed at intervals with dovetailed grooves $b$, adapted to loosely receive dovetails $a^3$ on the outer side of upright portions of the sector-blocks, which are also inclined outwardly and downwardly to conform to the slope of the contracting-ring, this construction constituting a sliding interlocking connection between the blocks and the ring, so that when the blocks are moved upwardly along the face of the ring they will be caused to move inwardly radially and will apply pressure to the tire. The contracting-ring is sustained fixedly on the upper ends of standards C, rising from a fixed bed-frame D, which standards are in the form of bolts, reduced at their upper ends where they pass through the ring to form sustaining-shoulders $c$, on which the ring rests and which is held firmly in place by nuts $c'$, applied to the threaded ends of the bolts.

The sector-blocks are given support and moved upward along the face of the contracting-ring by means of an actuating-head E, formed with a flat horizontal face $e$, on which the sector-blocks slidingly rest, which head is fixed to the upper end of a vertical piston F F' in a cylinder G, formed in the bed-frame. On the admission of fluid under pressure beneath the piston through a supply-pipe H, connected with a suitable source of pressure-supply, the piston will rise and will advance the sector-blocks simultaneously along the face of the contracting-ring, and by reason of the relation and form of the coöperating surfaces of the ring and blocks the latter will be urged inward radially. When the pressure is cut off from the cylinder and the latter opened to the atmosphere, as will be more fully described hereinafter, the weight of the blocks and piston will cause the latter to descend, and the downward movement of the blocks will by reason of the dovetailed connection between the same and the sloping face of the contracting-ring retract the blocks in a radial direction to their former position. The interlocking sliding connection of the pressure-blocks with the contracting-ring I deem of great importance and advantage in that these connections subserve two important functions: First, they serve as a means for positively and automatically retracting the pressure-blocks to release the wheel when the pressure is cut off from the actuating-cylinder and the latter opened to the atmosphere; second, they serve as a guiding means for the pressure-blocks in their movement along the face of the contracting-ring, maintaining the blocks at all times in their proper relations to each other and in this manner insuring a uniform and effective action of their pressure-faces on the tire under treatment. The admission of pressure to the cylinder and its exhaust therefrom are controlled by a piston-valve I, Fig. 1, the cylindrical casing I' of which is sustained by the bed-frame and is connected by pipe $i$ with the source of power, by pipe $i'$ with the atmosphere, and by the pipe H with the cylinder G. The valve I is formed with a peripheral port $i^2$, which when the valve is in its forward position, as shown in Fig. 1, will establish communication between pipe $i$ and pipe H and admit pressure to the cylinder G, and when the valve is in its rear position communication is established between pipe H and pipe $i'$ to the atmosphere, so that the cylinder may be exhausted. The controlling-valve I is operated manually by means of a vertical hand-lever J, pivoted on a horizontal axis, as at $j$, and having its lower end connected by links $j^2$ with the valve, by means of which operating mechanism the attendant may move the valve to its forward and rear positions to admit pressure to the cylinder and exhaust the same, respectively.

While I prefer to employ a piston and cylinder as the means for actuating the sector-blocks, it is manifest that other means may be used for this purpose without departing from the limits of my invention.

In the operation of my improved mechanism, the piston being in its lowered position, as shown in Fig. 1, with the sector-blocks retracted, the wheel with the tire thereon is seated in position to be acted on, with its rim resting on supporting-ribs K K', projecting upward from the opposite sides of the respective blocks to about midway of the height of the pressure-faces $a^2$, the relation of the parts being such that with the wheel thus sustained the tire will be surrounded by the circumferential pressure-surface formed conjointly of the faces $a^2$. Hand-lever J is now operated to adjust the controlling-valve in its forward position, which will admit pressure to cylinder G and the piston will be caused to rise, thereby advancing the sector-blocks upward along the face of the contracting-ring, which action will cause the blocks to move radially inward and their pressure-faces to impinge against and apply pressure to the face of the tire. When the latter has been subjected to sufficient pressure to properly upset it, the controlling-valve is adjusted to its rear position, establishing communication between the cylinder and the exterior air, and the piston and the parts supported thereby will descend, which action will positively retract the sector-blocks and release the wheel. The latter may now be removed and another wheel set in place and the foregoing operations repeated.

It will be observed from the construction described that the wheel is supported by the blocks themselves on the ribs K K', and, further, that the inward movement of the blocks to apply pressure to the tire is controlled directly by their bodily and simultaneous movement in the direction of the axis of the wheel.

My mechanism as a whole comprises few parts, is simple and effective in operation, and by reason of the support given by the blocks to the wheel the latter may be readily and quickly set in position to be acted on and removed when the operation is completed. The pressure applied by the sector-blocks uniformly throughout the circumference of the tire is gradual, but extremely powerful by reason of the character and directness of the actuating means.

It will be understood, of course, that when the pressure-blocks are advanced upward and are urged inward by the contracting-ring they approach each other in a circumferential direction, and it is manifest that in order to admit of this approach of the blocks they are so formed relatively that when they are retracted a space is left between each block and the next, as clearly shown in Fig. 2, this space being of such width as to permit of a sufficient approach of the blocks to apply the requisite pressure to upset the tire.

While in the drawings I have shown the contracting-ring formed at intervals with dovetail or undercut grooves and the pressure-blocks formed with dovetail ribs adapted to slide in the grooves, it will be understood, of course, that this arrangement may be reversed and the ribs may be formed on the face of the ring and the grooves to receive them formed in the blocks. The action in both cases will be the same, and the alternate constructions are obvious equivalents, both falling within the limits of my invention.

It will be observed that my improved machine embodies a definite and special means for moving the pressure members or blocks simultaneously in the direction of the axis about which they are grouped, which means is the piston and cylinder and actuating-head; a definite and special means for moving the pressure members transversely into action, which means is the coöperating inclined surfaces of the blocks and the ring; a definite and special means for permitting of a reverse movement of the blocks simultaneously in the line of said axis, which means is the mechanism for cutting off pressure to the actuating-cylinder and opening the same to the atmosphere, and a definite and special means for positively moving the pressure members transversely out of action, which means is the interlocking connection between the pressure members and the contracting-ring. I believe myself to be the first, therefore, to embody in a single organization all of the coöperating elements above described having a definite mode of action for the attainment of a definite and desired result.

It will be observed that in the operation of my improved machine when the hand-lever J is moved in one direction pressure is admitted beneath the actuating-piston F and, the head E rising, the pressure-blocks are moved radially inward and their pressure-faces engaged forcibly with the tire, resulting in the upsetting of the same. The movement of the hand-lever in the opposite direction cuts off pressure to the cylinder and opens the same to the exhaust, the result being that the weight of the wheel, blocks, and actuating-head causes the piston to descend, which action through the sliding interlocking connection of the blocks with the contracting-ring will cause the blocks to be automatically and positively retracted transversely, thereby releasing the wheel and restoring the operative parts to their former position, ready to receive another wheel to be treated.

Having thus described my invention, what I claim is—

1. In a machine of the type described, the combination with a plurality of pressure members arranged around an axis, of means for moving said members simultaneously in the direction of the axis, means controlled by said movement for moving the members transversely into action, means for permitting of a reverse movement of the members in the line of said axis, and means actuated by said reverse movement for positively and automatically moving said members out of action.

2. In a machine of the type described, the combination with a group of pressure members arranged around an axis, of a contracting member, said contracting member and group of pressure members being provided with coöperating surfaces adapted by the movement of one with relation to the other in the direction of said axis to move the pressure members transversely into action, means for effecting a motion of one of said parts with relation to the other in the line of said axis, and an interlocking sliding connection between each of the pressure members and the contracting member, said connection adapted, on the reverse movement of the parts in the line of said axis, to move the pressure members transversely out of action.

3. In a machine of the type described, the combination with a contracting-ring formed with a sloping face, of a group of circumferentially-arranged pressure-blocks, each provided with an inclined face coöperating with the sloping face of the ring, means for moving the blocks along the face of the ring in one direction in the line of the axis of the ring; whereby the blocks will be moved transversely inward to upsetting position, means for effecting a reverse movement of the blocks in the line of said axis, and a sliding interlocking connection between each block and said ring, said connections acting, when the movement of the blocks is reversed in the line of said axis, to positively retract them transversely out of action.

4. In a machine of the type described, the combination with a fixed contracting-ring having its inner face sloping outward and downward and formed at intervals with undercut grooves extending in the general direction of the axis of the ring, of a plurality of circumferentially-arranged pressure-blocks having their outer faces inclined to coöperate with the sloping face of the ring; whereby the blocks will be moved inward transversely to action when they are advanced in one direction along the face of the ring, a rib on the outer face of each block fitting slidingly the respective undercut grooves in the ring; whereby the blocks will be moved positively outward transversely out of action when they move along the face of the ring in a reverse direction, means for advancing said blocks simultaneously along the face of the ring in the line of the axis of the same, and means for permitting of a reverse movement of the blocks along the face of the ring in the line of said axis.

5. In a tire-upsetting machine, a plurality of pressure-blocks circumferentially arranged and each comprising a horizontal body portion sloping inward at its sides toward its inner end and provided at its edges with vertical ribs, and an upright portion at the outer end of the body portion, said upright portion having its inner face vertical and curved transversely, and its outer side sloping downwardly and outwardly, in combination with a contracting-ring surrounding said blocks and having its inner face sloping outward and downward to coöperate therewith, and means for moving said blocks simultaneously along the face of the ring.

In testimony whereof I hereunto set my hand, this 9th day of May, 1904, in the presence of two attesting witnesses.

EMIL EINFELDT.

Witnesses:
    M. LOUISE DODGE,
    A. NEILSON.